United States Patent
Mayer

(10) Patent No.: US 10,445,168 B2
(45) Date of Patent: Oct. 15, 2019

(54) DEVICE AND METHOD FOR EXECUTING A PROGRAM, AND METHOD FOR STORING A PROGRAM

(71) Applicant: Florian Mayer, Munich (DE)

(72) Inventor: Florian Mayer, Munich (DE)

(73) Assignee: NXP USA, INC., Austin, TX (US)

( * ) Notice: Subject to any disclaimer, the term of this patent is extended or adjusted under 35 U.S.C. 154(b) by 214 days.

(21) Appl. No.: 14/898,301

(22) PCT Filed: Jun. 18, 2013

(86) PCT No.: PCT/IB2013/054974
§ 371 (c)(1),
(2) Date: Dec. 14, 2015

(87) PCT Pub. No.: WO2014/203031
PCT Pub. Date: Dec. 24, 2014

(65) Prior Publication Data
US 2016/0147586 A1   May 26, 2016

(51) Int. Cl.
*G06F 11/07* (2006.01)
*G06F 11/10* (2006.01)

(52) U.S. Cl.
CPC .......... *G06F 11/079* (2013.01); *G06F 11/073* (2013.01); *G06F 11/0721* (2013.01); *G06F 11/0751* (2013.01); *G06F 11/1004* (2013.01)

(58) Field of Classification Search
CPC ............. G06F 11/1004; G06F 11/0751; G06F 11/073; G06F 11/0721; G06F 11/079
See application file for complete search history.

(56) References Cited

U.S. PATENT DOCUMENTS 4,368,532 A * 1/1983 Imazeki .............. G06F 11/1004
                                                714/722
5,978,814 A    2/1999 Miller et al.
(Continued)

FOREIGN PATENT DOCUMENTS

JP   2005209178   8/2005
JP   2007199845   8/2007
(Continued)

OTHER PUBLICATIONS

Notice of Allowance dated May 2, 2017 in U.S. Appl. No. 14/898278.
(Continued)

*Primary Examiner* — Yolanda L Wilson

(57) ABSTRACT

A device and a method for executing a program, and a method for storing a program are described. The method of executing a program includes a sequence of instruction cycles, wherein each instruction cycle comprises: updating the program counter value; reading a data word from a memory location identified by the updated program counter value, wherein the data word comprises an instruction and a protection signature; determining a verification signature by applying a signature function associated with the program counter value to the instruction; executing the instruction if the verification signature and the protection signature are consistent with each other; and initiating an error action if they are inconsistent with each other. A method for storing a program on a data carrier is also described.

10 Claims, 4 Drawing Sheets

(56) References Cited

U.S. PATENT DOCUMENTS

| | | | | |
|---|---|---|---|---|
| 5,974,529 | A * | 10/1999 | Zumkehr | G06F 9/3005 712/239 |
| 6,310,921 | B1 * | 10/2001 | Yoshioka | H04N 21/4341 348/E5.108 |
| 6,571,363 | B1 * | 5/2003 | Steiss | G06F 11/1497 712/227 |
| 6,678,837 | B1 * | 1/2004 | Quach | G06F 11/1004 712/244 |
| 6,895,508 | B1 | 5/2005 | Swanberg et al. | |
| 6,941,473 | B2 | 9/2005 | Etoh et al. | |
| 6,996,677 | B2 | 2/2006 | Lee et al. | |
| 7,117,398 | B2 * | 10/2006 | Flores | G06F 11/3636 340/146.2 |
| 7,287,140 | B1 | 10/2007 | Asanovic et al. | |
| 7,930,491 | B1 * | 4/2011 | Xu | G06F 11/3648 711/154 |
| 8,782,434 | B1 * | 7/2014 | Ghose | G06F 9/3851 711/118 |
| 9,703,622 | B2 * | 7/2017 | Mayer | G06F 11/079 |
| 2006/0053182 | A1 | 3/2006 | Sen et al. | |
| 2006/0136780 | A1 * | 6/2006 | Meng | G06F 11/1076 714/13 |
| 2007/0111836 | A1 | 5/2007 | Kwon et al. | |
| 2008/0133929 | A1 | 6/2008 | Gehrmann et al. | |
| 2008/0215920 | A1 * | 9/2008 | Mayer | G06F 11/28 714/38.1 |
| 2009/0125623 | A1 * | 5/2009 | Garg | H04L 9/3247 709/224 |
| 2009/0265579 | A1 * | 10/2009 | Yoshida | G06F 11/1405 714/15 |
| 2010/0017660 | A1 | 1/2010 | Tilton et al. | |
| 2011/0126065 | A1 * | 5/2011 | Bancel | G06F 21/52 714/732 |
| 2011/0209006 | A1 * | 8/2011 | Igarashi | G06F 11/0721 714/37 |
| 2013/0055025 | A1 * | 2/2013 | Feix | G06F 21/554 714/32 |
| 2013/0086393 | A1 | 4/2013 | Pogmore | |

FOREIGN PATENT DOCUMENTS

| | | |
|---|---|---|
| KR | 20060069041 | 6/2006 |
| KR | 20080104591 | 12/2008 |

OTHER PUBLICATIONS

International Search Report and Written Opinion correlating to PCT/IB2013/054974 dated Apr. 1, 2014.
England, D.M. "Capability concept mechanisms and structure in system 250", Plessy Telecommunications Research, Maidenhead, GB, in Proceedings of the International Workshop on Protection in Operating Systems. IRIA, 1974.
Notice of Allowance dated Jun. 5, 2017 in U.S. Appl. No. 14/898278.

* cited by examiner

FIG. 3

| | |
|---|---|
| INST_0 | SIG_0 |
| INST_1 | SIG_1 |
| INST_2 | SIG_2 |
| INST_3 | SIG_3 |
| INST_4 | SIG_4 |
| INST_5 | SIG_5 |
| INST_6 | SIG_6 |
| INST_7 | SIG_7 |
| INST_8 | SIG_8 |
| INST_9 | SIG_9 |

# DEVICE AND METHOD FOR EXECUTING A PROGRAM, AND METHOD FOR STORING A PROGRAM

FIELD OF THE INVENTION

This invention relates to a device and a method for executing a program, and to a method for storing a program.

BACKGROUND OF THE INVENTION

Data processing systems, such as microcontrollers, personal computers and computer networks are usually provided with some form of safety mechanism to ensure the integrity of data in the data processing device. Data stored in a data processing device may be vulnerable for a variety of reasons. For example, the status of a bit in a memory register may change in an unpredictable manner due to, for example, particle impact from, e.g., radiation. Furthermore, the status of individual bits or entire registers may be accidentally changed by faulty software. A third kind of risk may be produced by malicious software.

A context is a set of data associated with a task on a data processing device. The data processing system may be designed such that any task is allowed to access its own context but not any other context. The data of a specific task may thus be shielded against other tasks. Switching from one task to another task may involve storing the context of the current task, so that the current task may be resumed at a later point in time. A task may be an entire program, a thread, a subroutine, or a single instruction or any other kind of process on the data processing system. A task switch may therefore also be referred to as a context switch.

Data processing devices may be subject to functional safety standards, such as ISO 26262 or IEC 61508. There is therefore a need for a reliable scheme of detecting data corruption, notably in components that are relevant for functional safety. As mentioned above, data may be corrupted by, e.g., faulty software components. Data may even be corrupted by a lack of cooperation between software components. For example, a stack frame generated by a certain context may be corrupted by another context due to faulty software. Accordingly, there is a particular need for detecting corrupted stack frames and for providing stack-frame protection. The data that may be corrupted may include executable data, that is, program code. There is therefore a need for ensuring safe code execution.

One approach to improving the integrity of data in a data processing system involves the use of a checksum or a hash function. Checksums and hash functions are related mathematical concepts, and no distinction will be made between the two in this specification. The idea behind this approach may be seen in determining for a given data item (payload item) a signature in dependence on the data item in question. Identical payload items have identical signatures. Different payload items may have identical or different signatures. A signature function is a function that maps a set of payload items onto a set of signatures. A signature function is generally not bijective. The set of signatures may thus be smaller than the set of payload items for which the signature function is defined. Considering, for instance, a system with a word size of 32 bits, a signature function may be designed to protect individual data words. The signature function should thus assign a signature to each of the $2^{32}$ different data words that may occur in the system. The signature may, for instance, have a length of seven bits. In this scenario, the signature function thus maps the set of $2^{32}$ payload data words onto the set of $2^7 = 128$ signatures. Comparing the signatures of two payload items provides a way of determining whether the two data items differ. Data items with different signatures necessarily differ. Payload items with identical signatures are, however, not necessarily identical, assuming that the signature function is non-bijective. For instance, considering again the example of $2^{32}$ different payload items and $2^7 = 128$ different signatures, the set of payload items may be partitioned into 128 subsets associated with the 128 different signatures, each subset containing those payload items that are mapped onto the same signature. In an example in which the $2^{32}$ payload items are evenly distributed over the 128 subsets, there is thus a likelihood of 1 to 128 that the payload items from the set of $2^{32}$ payload items belong to the same subset and thus have the same signature. The pair of data items consisting of the payload item and the corresponding signature may be referred to as a signed data item or as a protected data item. A valid signed data item is self-consistent in the sense that its signature component is the signature of its payload component. When the payload component is accidentally modified, there may be a substantial likelihood for the signed data item to become inconsistent. This likelihood may, for instance, be 127 out of 128 in the above-described example. Recomputing the signature for the payload component of a signed data item and comparing the recomputed signature to the signature component of the signed data item thus provides a way of checking the integrity of the respective signed data item.

SUMMARY OF THE INVENTION

The present invention provides a device and method for executing a program, and a method for storing a program.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 3 schematically shows an example of an embodiment of a list of signed instructions.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
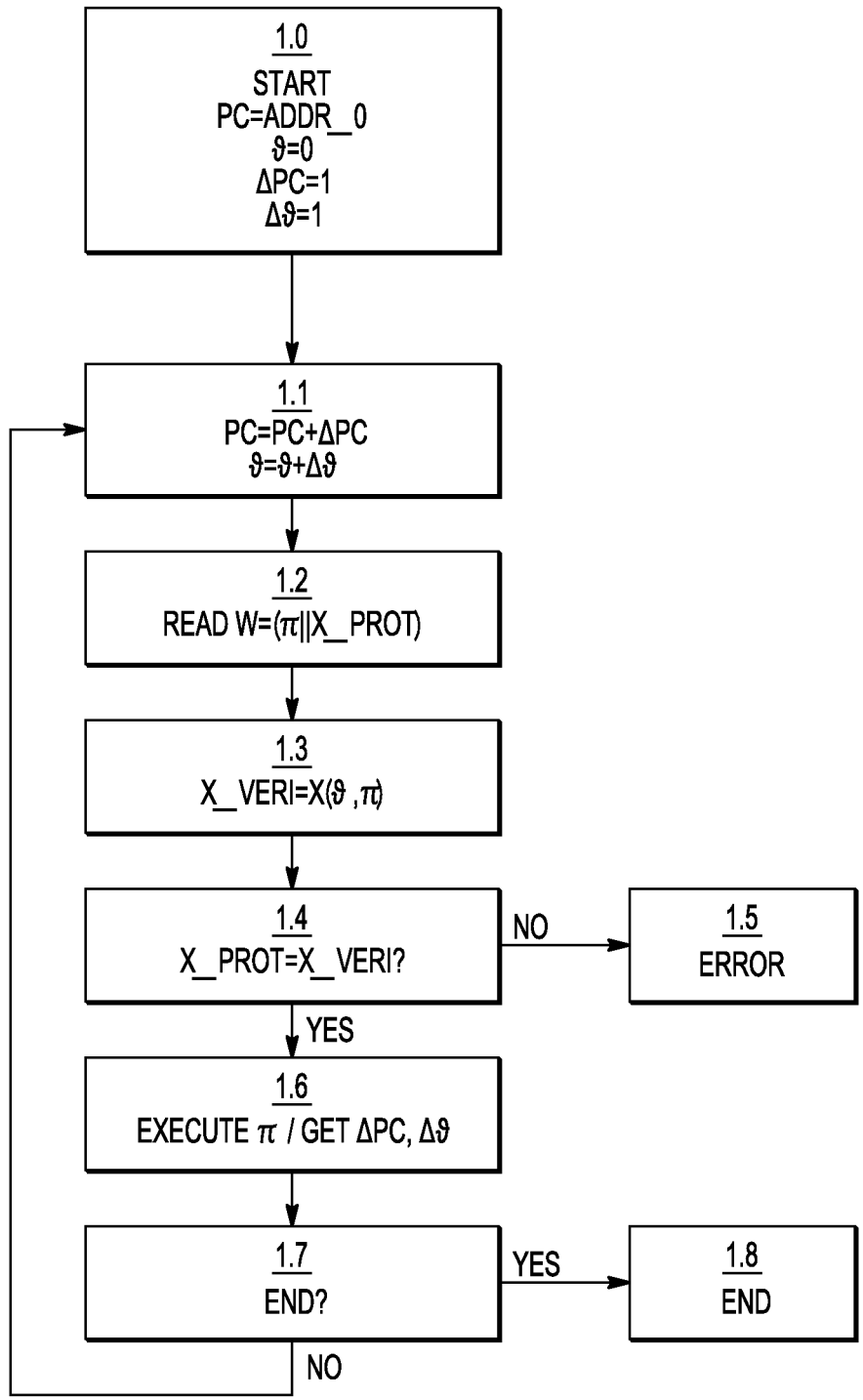
FIG. 1 shows a flow chart of an example of an embodiment of a method of executing a program.

The example of a method of executing a program illustrated by the flow chart in FIG. 1 comprises providing a program counter value and performing a sequence of instruction cycles. Each instruction cycle may comprise: updating (1.1) the program counter value; reading (1.2) a data word from a memory location identified by the program counter value, wherein the data word comprises an instruction and a protection signature; determining (1.3) a verification signature by applying a signature function associated with the program counter value to the instruction; executing the instruction if the verification signature and the protection signature are consistent with each other (1.6); and triggering an error response (1.5) if they are inconsistent with each other. The signature function may, for example, be a checksum function, e.g., a cyclic redundancy check (CRC) function.

The signature function may be associated with the program counter value in the sense that it changes when the program counter changes. However, it may be beneficial to evaluate the signature function without making use of the program counter value itself. Instead, it may be beneficial to provide a context value correlated to the program counter value. For instance, the context value may be incremented in the same or similar manner as the program counter in each instruction cycle. Both the program counter value and the context value may, for instance, be updated independently from each other but on the basis of the same flow control information. The flow control information may, for instance, comprise the most recent instruction of the program flow in conjunction with none, one, or more state variables. For instance, the program counter value and, similarly, the context value may be incremented by one increment, e.g., 1, when this most recent instruction is a normal instruction, i.e., an instruction which is not a flow control instruction. Flow control instructions may include, for instance, relative jumps, absolute jumps, subroutine calls, and returns from subroutines.

The program counter may be a particular special purpose register for holding the program counter value. The program counter value may indicate the memory location of an instruction that is to be executed next. The program counter value may, for instance, be the address of this memory location. In each instruction cycle, the program counter (PC) and, similarly, the context value (denoted herein) may thus be replaced by updated values $PC+\Delta PC$ and $\theta+\Delta\theta$, respectively (block 1.1 in FIG. 1). The context value may be considered equivalent to the program counter and may take the same or a different binary form. Notably, the context value $\theta$ may be provided by a physical register or other kind of memory cell separate from the program counter. Although the program counter and the context value may be regarded as mathematically equivalent in the sense that there may be a one-to-one relationship between the two quantities, their purposes may be different. The program counter may serve to identify the memory locations of instructions of the program. The context value, in contrast, may be used to define a specific signature function for each memory location holding an instruction of the program. The signature function may be used to verify the integrity of data at the respective memory locations. Although, in principle, the program counter may be used to define the respective signature functions, the introduction of the context value may help to ensure that a corruption of the program counter value may be detected.

In block 1.2, a data word w may be read from the memory location identified by the program counter value. The data word w may comprise an instruction $\pi$ and a protection signature $\chi$. The instruction may be considered the payload data of the data word, whereas the protection signature may be used for checking the integrity of the instruction and also to detect unallowed access to the memory location in question, namely by the operations in subsequent blocks 1.3 and 1.4 described below.

In block 1.3, a verification signature may be computed by applying the signature function associated with the current program counter value to the instruction that was read in the preceding block 1.2. The verification signature may thus be computed using, as input data, the current instruction and information correlated with the program counter value, such as the program counter value itself or the context value mentioned above. Again, it should be pointed out that it may not be strictly necessary to introduce the context value as a separate variable in addition to the program counter but that doing so may be beneficial in view of a corruption of the program counter value. More specifically, when the program counter value is corrupted due to, e.g., a neutron impact, a wrong memory location would be accessed in block 1.2 thus resulting in a substantial likelihood that applying the signature function of the current context value to the payload data of the wrong memory location will produce a verification signature different from the protection signature of the wrong memory location.

Turning back to the description of the flow chart, the verification signature generated in block 1.3 may be compared against the protection signature of the data word read in block 1.2.

In the present, it is assumed that the protection signature of the instruction sequence of the program was generated by the same signature functions that are used in the present method of executing the program. Therefore, in a scenario in which the program data is intact and the program is executed correctly, the verification signature recomputed in block 1.3 may be expected to be identical to the protection signature of the respective instruction. Consequently, any mismatch between the verification signature the protection signature may be interpreted as an indication that an error has occurred.

An error response may therefore be initiated in the event of a mismatch between the protection signature and the verification signature (block 1.5). The error response may, for example, include one or more of the following: terminating the program and generating an error report.

If, however, the verification signature is found to be identical to the protection signature, the instruction $\pi$ that was read in block 1.2 as part of the data word w may be executed. If the instruction is a flow control instruction such as a relative jump, an absolute jump, a call of a subroutine, or a return from a subroutine, the program counter value and, if present, the context value may be modified accordingly. If the instruction is an end instruction, the program may be terminated (block 1.8). Otherwise, the process flow may return to block 1.1 and the next instruction cycle may be performed.

In other words, memory locations with program instructions may be assigned individual signature functions. A signature function may, for instance, be defined in terms of a generator polynomial. A generator polynomial may thus be defined individually for the various memory locations containing the instructions. The memory locations may form a sequence of memory locations, wherein the memory locations are ordered in accordance with, e.g., their addresses in an addressing scheme of the system in question. It may be beneficial to define the signature functions for the various memory locations of the sequence such that successive memory locations have different signature functions. For instance, a first memory location of the sequence may have a first signature function associated with it. The first signature function may, for instance, be defined in terms of a first generator polynomial. A second memory location may have a second signature function associated with it, wherein the second signature function differs from the first signature function. The second signature function may, for instance, be defined in terms of a second generator polynomial different from the first generator polynomial. A third memory location succeeding the second memory location may again have the first signature function or, alternatively, a third signature function different from both the first and the second signature functions. Using a larger number of different signature functions for the various memory locations of the sequence may increase the likelihood of detecting an erroneous read access to one of the memory locations.

For instance, a system in which there are $2^5$ different signature functions, represented by, e.g., $2^5=32$ different generator polynomials, an attempt of reading and executing one of the instructions of the program might be triggered erroneously by a second program not related to the program stored in the memory locations in question. In this case, there may be a likelihood of 1 to 32 of the second program providing the correct signature function to determine the verification signature required for executing the instruction stored the memory location in question.

Figure 2:
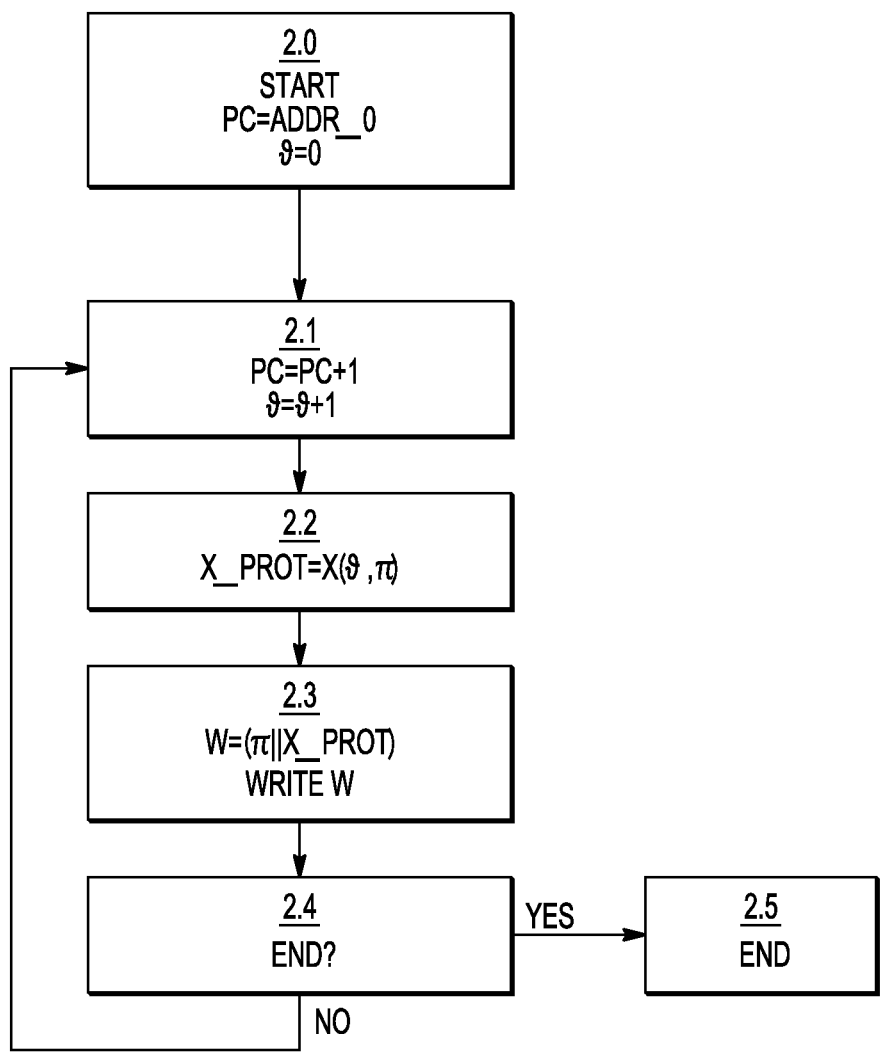
FIG. 2 shows a flow chart of an example of a method of storing a program on a data carrier.

The flow chart in FIG. 2 schematically illustrates an example of a method of storing a program on a data carrier. The method may notably include writing a sequence of instructions to a corresponding sequence of memory locations on the data carrier. Each memory location may, for instance, be a memory cell of a magnetic or optical storage device or a register implemented in, e.g., flip flops. Each memory location may be identified by a corresponding address. The method may comprise providing a context value and performing a sequence of write cycles. Each write cycle may comprise incrementing the context value by one increment; determining a protection signature by applying a signature function to an instruction, wherein the signature function depends parametrically on the context value; selecting a next memory location among a plurality of memory locations; and writing a data word to the selected memory location, wherein the data word comprises the instruction and the protection signature. The data word may, for instance, be a concatenation of the instruction and the signature.

In block 2.0, an address variable may be set to an initial value. The address variable may be referred to herein as a program counter and its value as the program counter value, by analogy to the process of executing the program. Furthermore, a context value θ may be set to an initial value $θ_0$. The initial context value $θ_0$ may be the same for every program to be generated using the present method. $θ_0$ may, for instance, be 0 for every program. An advantage of using the same initial context value, e.g., 0, for any program lies in that any program protected by the present method may be executed without reading or otherwise determining the initial context value θ0. Alternatively, however, the initial context value $θ_0$ may be stored as a key for protecting the program against illegal execution. The initial value $θ_0$ may, in this case, be stored separately from the program.

In subsequent block 2.1, the program counter and the context value may each be incremented by a certain increment, e.g., one.

In subsequent block 2.2, a protection signature may be computed by applying a signature function to an instruction, wherein the signature function depends parametrically on the context value. The signature function may, for instance, be a checksum, e.g., a CRC function.

In subsequent block 2.3, a data word may be formed of the instruction and the protection signature. The instruction and the protection signature may, for instance, be concatenated. For example, the protection signature may be appended to the instruction or vice versa. The data word comprising the instruction and the protection signature may then be written to the memory location indicated by the program counter.

In subsequent block 2.4, it may be determined whether further instructions are to written to the data carrier. In this case, the program flow may return to block 2.1, and a next write cycle may be initiated. Otherwise, the process may be terminated (block 2.5).

Turning now to FIG. 3, an example of a program on a data carrier is schematically illustrated. The data carrier may, for instance, be located in the memory unit 14 shown in FIG. 4. In the shown example, the program comprises a sequence of instructions Inst_0 to Inst_9 and a corresponding sequence of protection signatures Sig_0 to Sig_9. The shown sequence of ten data words may thus be contained in a sequence of ten memory locations. This is, of course, only an example, and a program may generally comprise an instruction sequence consisting of fewer or more instructions than ten. Each memory location may have associated with it a respective signature function, namely, the signature function that was used to compute the respective protection signature. Each signature function may, for instance, be defined by a context value θ. The context values for the various memory locations may be defined explicitly, e.g., by means of a look-up table, or otherwise, e.g., analytically. For instance, the context value may be defined to increase (or decrease) by a certain increment from one memory location to the next memory location. The context value may thus assume a certain maximum value for a certain memory location. When passing from this memory location to the next one, the context value may be reset to 0, for example. The sequence of context values corresponding to the sequence of memory locations may thus exhibit a saw tooth characteristic.

Figure 4:
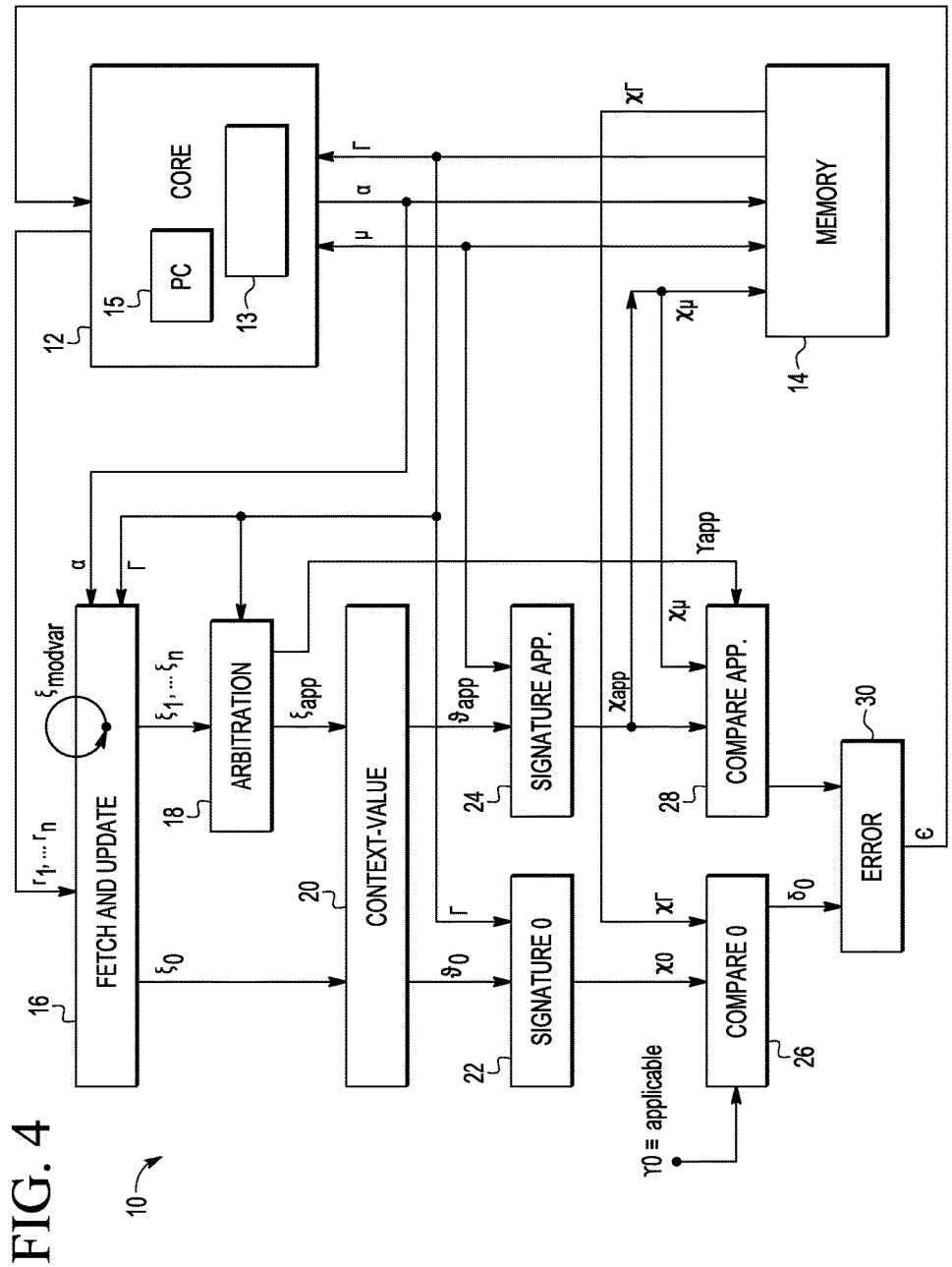
FIG. 4 schematically shows an example of an embodiment of a data processing device.

Referring now to FIG. 4, an example of an embodiment of a data processing device 10 is described. The device 10 is arranged to execute a program in a sequence of instruction cycles. The program comprise instructions stored in a plurality of memory locations of a memory unit 14. In the shown example, the memory unit 14 is part of the data processing device 10. In another example (not shown), the memory unit 14 may be a separate unit connected to or connectable to the data processing device 10. The data processing device 10 notably comprises a program counter 15, a memory access unit 13 arranged to read a data word w from a memory location identified by the program counter value, a signature unit 22, 24, a processing unit (core unit) 12, and error signal unit 30. In the present example, the signature unit 22, 24 comprises an instruction signature unit 22 dedicated to instruction signatures and a data signature unit 24 dedicated to signatures for non-instruction data.

For each instruction cycle, the program counter 15 provides a respective program counter value identifying a memory location in the memory unit 14. The memory access unit 13 reads a data word w from the identified memory location. The data word w may comprise an instruction Γ and a protection signature χ. The instruction signature unit 22 then determines a signature function Γ→χ corresponding to the program counter value and determines a verification signature χ_veri by applying the signature function Γ→χ to the instruction Γ. The processing unit (core unit) 12 executes the instruction Γ if the verification signature χ_veri and the protection signature χ_prot are consistent with each other, e.g., if they are identical or, e.g., if they differ only to a certain degree. In contrast, the error signal unit 30 initiates an error action if the verification signature χ_veri and the protection signature χ_prot are inconsistent with each other. The error action may, for example, include stopping or interrupting execution of the program.

The present example of a data processing device 10 is described in greater detail below, by making reference to a few mathematical definitions.

The set of binary numbers with n binary digits is defined as $$B_n := \{i \in N | 0 \leq i \leq 2^{n-1}\}$$

i.e., the set of natural numbers from 0 to $2^{n-1}$.

Two binary numbers a and b can be concatenated in the following manner:

$$a\|b := a \cdot 2^n + b, \text{ where } a \in B_m, b \in B_n, \text{ and } a\|b \in B_{m+n}$$

The word size in bits of a machine may be expressed by a constant η as a number of bits. The word size η may, for example, be 32, 64, or any other natural number, depending on the machine and possibly also on an operating mode of the machine. For instance, some machines may be operable using, alternatively, a word size of 32 or 64 bits.

The data processing system may be arranged to provide a plurality of context configurations. Each context configuration may have a bit size c which may be the same for all context configurations in this system.

The data processing system may be further arranged to provide a plurality of signatures. Each signature may have a bit size s which may be the same for all signatures.

A unit may be defined as a set of functions, or state variables, or both, that may be influenced by input signals of the unit. A unit may be arranged to produce output signals in dependence on its state variables and input signals. If a unit has state variables, it may provide update functions which determine the next value of a state variable from the current input signals and current values of the state variables. A unit may also provide an initial state for its state variables. The unit can therefore be considered a finite state machine.

For each unit described herein, only those elements which are necessary to understand the unit in question will be described for the sake of brevity and clarity. It may, for instance, be implicit that a number of different functions in a unit may be included in a set of functions which, in turn, are part of the corresponding finite state machine. Unless specified differently, all named variables may have an initial state of 0.

Input signals and state variables may be functions over discrete time instances, $\tau_i$. A function implemented by a unit may therefore be a function which evaluates its inputs and state variables at a time instance $\tau_i$, to produce a result for its outputs at the same time instance or for its internal variables at the next time instance $\tau_{i+1}$. For the sake of a short notation within the specification of a unit, references to evaluated functions on the right hand side of an expression such as $f(\tau_i)$ may be shortened to the function name itself. They can thus be read as "signal f at time $\tau_i$".

If a function f is indicated on the left hand side of an equation, it will read out to either $f(\tau_{i+1})$ for a variable or $f(\tau_i)$ for an output signal, depending whether it is a variable or a signal. For example, $$f := g + 1 \Leftarrow \begin{cases} f(T_{i+1}) := g(T_i) + 1, & f(\ ) \text{ is a variable} \\ f(T_i) := g(T_i) + 1, & f(\ ) \text{ is an output signal} \end{cases}$$

Still referring to FIG. 4, the data processing device 10 may be arranged to provide for stack frame protection, data protection, and signed code execution. Variants of the device 10 which lack at least one of these three protection schemes may be obtained from the present device 10 by omitting or deactivating units explicitly associated with the respective protection scheme.

The data processing device 10 may comprise a core unit 12 and a memory unit 14. The core unit 12 may, for example, be a central processing unit (CPU). The core unit 12 may be operated to retrieve program code from the memory unit 14 and to execute it. The core unit 12 may further read data words from the memory unit 14. The core unit 12 may further write data words to the memory unit 14. The core unit 12 may, to this end, be connected to the memory unit 14 via signal lines for transmitting signals Γ, $X_\Gamma$, μ, α, and $X_\mu$. The signal Γ may convey instructions for program execution from the memory unit 14 to the core unit 12. Each instruction in the memory unit 14 may be provided in the form of a signed data word. The signed data word comprising an instruction as a payload item and a corresponding signature may be referred to as a signed instruction. The instruction and the corresponding signature may have bit lengths of, e.g., 32 bits and 7 bits. However, other bit lengths may be envisioned. The signatures associated with the various instructions of the program code in the memory unit 14 may, for example, be generated along with the program code at compile time, i.e., when the executable program code is generated from a source code. Alternatively, the instruction signatures may, for example, be generated from the executable program code. For each instruction of the program code in the memory unit 14, the corresponding signature may be provided by a signal $X_\Gamma$.

The memory unit 14 may contain additional data in addition to said program code. Such additional data may be referred to as non-executable data. It should be noted however that the non-executable data, i.e., payload data not included in the program code, may in principle include executable instructions. Executable instructions may, for example, may be included in the non-executable data as backup data or for archival purposes. The difference between the program code and the non-executable data may thus be seen in that the program code is intended to be read and executed by the core unit 12, whereas the non-executable data may equally be read by the core unit 12 without however being executed. The non-executable data may be communicated to or from the memory unit by a signal μ. A bidirectional bus may be provided for conveying the signal μ.

The core unit 12 may further be arranged to drive an address signal α in order to access the correct memory location within the memory location 14 for read (load) or write (store) operations.

Each payload item included in the non-executable data may be provided along with a corresponding signature, the payload item and the corresponding signature thus forming a signed data item. Signed instructions included in the program code and signed data items included in the non-executable data may have the same formal structure. Notably, their payload components may have the same bit lengths. Their signatures may also have the same bit lengths of, e.g., 7 bits. Each signed data item in the memory unit 14 irrespective of whether the payload component is executable or not may thus have a signature associated with it, wherein the signature may also be stored in the memory unit 14. The signatures associated with executable instructions may however be defined and used in a manner which may be different compared to the non-executable data. Notably, the signature function defining the signature for a given instruction may be defined on the basis of a program flow of the program code. Roughly speaking, the signature function for generating a signature of a given instruction may depend on the position of the respective instruction in a flow chart of the program. This aspect will be described in greater detail further below.

The signatures associated with the non-executable instructions may be communicated to and from the memory unit 14 by a signal $X_\mu$. The signature for a non-executable data word may be read from the memory unit 14 in response to a load instruction. In the event of a store instruction, the signature for the data item to be stored may be generated by applying the appropriate signature function to the respective data item. The data item may then be stored along with the thus generated signature in the memory unit 14.

The protection mechanism described herein can be extended to any data processing system comprising more than one processing core. Furthermore, it may be implemented in units or devices which lack a processing core. For instance, it may be implemented in a direct memory access (DMA) controller. It is therefore pointed out that the device shown in FIG. 1 is only a specific example. In this example, the core unit 12 is arranged to operate in accordance with a signed code execution scheme. The core unit 12 may further be arranged to operate in accordance with, e.g., stack frame protection or simple data protection schemes.

A context configuration $\xi$ may comprise a context identifier $\xi_{id}$, a generator polynomial $\xi_{pol}$ of size p, a variable context modifier $\xi_{modvar}$, a context type $\xi_{type}$, and none, one, or more predicates $\lambda_i$ ($\xi_{type}$). The predicates $\lambda_i$ may further specify the context type $\xi_{type}$. Formally, a context configuration $\xi$ may be defined as $$\xi:=(\xi_{id},\xi_{pol},\xi_{modvar},\xi_{type},\{\lambda_i(\xi_{type})\})\in C, \text{ with } C:=(B_{c-p}\times B_p\times B_n\times T\times P_\xi)$$

wherein T is a number of types (see below) and $P_\xi$ is a number of predicates $\lambda_i$ on those types $\xi_{type}$.

The size p of the generator polynomial may be specific to each configuration $\xi$. The size p may also be seen as a parameter of the context configuration. The size p may be the bit length of a binary expression defining the generator polynomial, i.e., defining the coefficients of the generator polynomial.

The context identifier and the generator polynomial may affect the computation of the context value. The context modifier may be an internal variable. It may be used, for example, to track a correct sequence of instructions for signed code execution or to maintain locality for data access to a stack frame by, e.g., incrementing or deincrementing the context value on, e.g., function linkage.

A context configuration may, for instance, have the following types $\xi_{type}$:

$\xi_{type}$="signed code execution": a context configuration of this type may describe an instance of the signed code execution protection mechanism. $\xi_0$ may be the dedicated one and only context configuration of this type. In a multi-core system, for example, each core may typically have one context configuration of this type.

$\xi_{type}$="data protection": a context configuration of this type may describe an instance of the data protection mechanism. This instance may, for example, include stack frame protection or protection of other data or both. The data processing device 10 may provide a set of context configurations $\xi_1$ to $\xi_n$. A subtype may have to be further specified via its predicates.

The following predicates may be used to further specify a type:

"Load via register-predicate $\lambda_{loadreg_i}$": This predicate may be allowed for the above-mentioned data protection type. If this predicate exists, the corresponding context configuration may be applicable when the core unit 12 attempts to load data from the memory unit 14. The subscript "loadreg_i" indicates the register holding the address of the respective memory location.

"Store via register-predicate $\lambda_{storereg_i}$": This predicate may also be allowed for the above-mentioned data protection type. If this predicate exists, the corresponding context configuration may be applicable when the core unit 12 attempts to store data in the memory unit 14. The subscript storereg_i may indicate a register holding the address of the corresponding memory location.

"Fetch on operations $\lambda_{fetch-operation_{\Gamma i}}$": This predicate may be allowed for every type. When the core unit 12 executes an operation Γi, this context configuration may be fetched. If no such predicate exists, this context configuration will never be fetched (reset state).

"Restore on operations $\lambda_{restore-operation_{\Gamma i}}$": This predicate may be allowed for every type. It may support implementing a stack of context configurations so that, e.g., on return from an application programming interface (API) function of a different software module, the hardware restores the existing context of the calling function.

"Update operation—increment $\lambda_{update_{\Gamma i}}^+$": This predicate may be allowed for every data protection type. Each time the core unit 12 executes the specified operation $\Gamma_i$, the value $\xi_{modvar}$ is incremented.

"Update operation—decrement $\lambda_{update_{\Gamma i}}^-$": This predicate may be allowed for every data protection type. Each time the core unit 12 executes the specified operation $\Gamma_i$, the value $\xi_{modvar}$ is decremented.

"Use address for data storage $\lambda_\alpha$": This predicate may be allowed for the data protection type. If this predicate is available for a specific context configuration, the update unit (see below) may use the address signal α to provide the context modifier $\xi_{mod}$. The variable context modifier may be ignored in this case.

Referring back to FIG. 1, the example of a data processing device 10 shown therein comprises a context fetch-and-update unit 16. The context fetch-and-update unit 16 may be arranged to enable a program executed by the core unit 12 to preload a set of one or more context configurations and to specify a condition for activating them. The context fetch-and-update unit 16 may also hold a variable part of a context configuration $\xi_{modvar}$. The context fetch-and-update unit 16 may be arranged to update the variable part of the context configuration $\xi_{modvar}$ as specified by the type and predicates of the context configuration.

For instance, the following use cases summarize examples of possible activation conditions:

"Function linkage": This context configuration may be relevant for signed code execution. If the program needs to call an API function belonging to a different software module, it may first have to set up the context needed to enter that remote location. Alternatively or in addition, a stack may be implemented so that the previous context configuration can be restored automatically on return.

"Load and store operation": This context configuration may be relevant for, e.g., local variables in a software module. In order to protect local variables by means of data corruption detection, a context configuration for these variables may be set up. A next load or store operation that uses the specified address register may activate that configuration.

"Return from interrupt": This context configuration may enable an operating system to restore an existing task context for stack frame protection, data protection, and signed code execution. The OS service routine may execute a "return from interrupt" instruction to jump into a next task to be scheduled.

The context fetch-and-update unit 16 may comprise a set of n registers $r_i$. Each of these registers may be designed sufficiently large so as to be capable of holding one context configuration. The registers $r_i$ may behave like state variables and may be accessible to write operations by the core unit 12 at any time. Write access via, e.g., existing contexts may be restricted by means of a further protection mechanism (not further described here). The context fetch-and-update unit 16 may further comprise another set of registers arranged to hold all active context configurations $\xi_i$ of the data processing device 10. These configurations may be made available to other units within the data processing device 10, e.g., to units 18 and 20. The state transitions of the underlying finite state machine of the context fetch-and-update unit may be defined as follows:

$$r_i(T_j + 1) = \begin{cases} r_i(T_j), & \text{keep if } !\exists \lambda_{\text{fetch-operation}_{\Gamma_k,r_i}} \| \Gamma(T_j) = \Gamma_k \\ r_i(T_0), & \text{reset on fetch} \end{cases}$$

In other words, if there is exactly one predicate "fetch on operation" $\lambda_{\text{fetch-operation}_{\Gamma_i}}$ such that $\Gamma(T_j)=\Gamma_k$, the register state at time $T_j+1$ remains unchanged. Otherwise, it is reset to its initial value $r_{(T_0)}$.

The fetch registers ri may hold all data for a context configuration. In this case, the above equation denotes a predicate for context configuration $\xi_i$ which is still stored in the fetch register using the term $\Delta_{\text{predicate-name},r_i}$.

The active context configurations may be updated as follows:

$$\xi_i(T_j + 1) = \begin{cases} \xi_i(T_j), & \text{keep if } !\exists \lambda_{\text{fetch-operation}_{\Gamma_k,r_i}} \| \Gamma(T_j) = \Gamma_k \\ r_i(T_j), & \text{fetch from fetch register if condition is met} \end{cases}$$

The fetch-and-update unit 16 may also be arranged to update the variable context modifier $\xi_{modvar_i}$. Furthermore, it may be arranged to provide the context modifier signal $\xi_{mod_i}$. This signal may be used by the context value unit 20 (see below) to compute a current context value.

Both computations may use predicates on the context configuration to determine an exact behavior. In the case of signed code execution, for example, the update unit may be arranged to increment the variable context modifier $\xi_{modvar_i}$ for each consecutive instruction executed by the core unit 12 and to add a corresponding offset for relative jumps. Stack frame protection may be implemented by incrementing and decrementing $\xi_{modvar_i}$ on function linkage, for example. A jump to a subroutine may also increment $\xi_{modvar_i}$ and a return may decrement it again. Data protection may be extended to use a bit mask of the address $\alpha$ of the data to be stored or loaded for the computation of $\xi_{mod_i}$. The variable context modifier $\xi_{modvar_i}$ may be ignored in this case.

The context value unit 20 may derive a context value $\theta(\xi,\xi_{mod})$ on the basis of a context configuration $\xi$ and a dynamic context modification $\xi_{mod}$ as follows:

$$\theta:(B_{c\text{-}p} \times B_p)B_\eta \to B_{c'}((\xi_{id},\xi_{pol})\xi_{mod}) \mapsto \xi_{id} \|(\xi_{mod} \cdot \xi_{pol} \bmod 2^p)$$

The signature unit 22, 24 may be arranged to compute a signature $\chi$ on the basis of a given context value $\theta$ and a payload item $\pi$, by evaluating a context-dependent signature function $\chi$ for the given context (specified by the context value $\theta$) and the given payload item $\pi$:

$$\chi: B_\eta \times B_{c\text{-}p} \to B_s, (\pi,\theta) \mapsto \chi(\pi,\theta)$$

The payload item $\pi$ may, for example, be an instruction $\Gamma$ or a non-instruction data item $\mu$. The payload item $\pi$ concatenated with the signature $\chi$ $$\pi \| \chi \in B_{s+\eta}$$

may be referred to as signed data. The term "signed data" may be used for both instruction data and other data. A data word $w \in B_{s+\eta}$ is called valid with respect to the context value $\theta$ if $w=x\|\chi(x,y)$ wherein x is the payload component of the data word w. In the shown example, the signature unit 22, 24 comprises a first signature unit (instruction signature unit) 22 for instructions and a second signature unit (data signature unit) 24 for non-instruction data.

The compare unit 26, 28 may be arranged to receive a signature $\chi$ from, e.g., the signature unit 22, 24 and to compare it to an existing signature $\chi'$, e.g., loaded from the memory unit 14. The compare unit 26, 28 may be arranged to perform the comparison only if another signal $\gamma_\delta$ indicates that this comparison shall be taken into account. The compare unit 26, 28 may thus detect data corruption in instructions or other data. The compare unit 26, 28 may be arranged to generate a comparison value defined, for instance, as follows:

$$\delta: B_s \times B_s \times B_1 \mapsto B_1$$

$$\delta(\chi, \chi', \gamma_\delta) := \begin{cases} 1 & \text{if } \chi \neq \chi' \text{ ('invalid') and } \gamma_\delta = \text{('applicable)} \\ 0 & \text{else ('valid')} \end{cases}$$

The compare unit 26, 28 may thus indicate whether its input data item, e.g., an instruction or other data item loaded from the memory unit 14, is valid or invalid with respect to the current context.

The error signal unit 30 may, for example, be arranged to evaluate a maximum function 249 over a number of outputs from the compare unit $\delta_i$ to indicate whether a data corruption has been detected. In the shown example, only two compare units are provided, namely a first one 26 for non-instruction data and a second one 28 for instructions. The error signal unit 30 may accordingly have two inputs in the present example. The maximum function $\varepsilon$ may, for example, be defined as follows:

$$\varepsilon: \bigcup_{i=0}^{1} B_1 \mapsto B_1$$

$$\varepsilon(\delta_0, \delta_1) := \max(\delta_0, \delta_1)$$

The arbitration unit 18 may be arranged to select among a set of so called applicable load or store configurations $\xi_i, \ldots, \xi_n$ a configuration to be evaluated for the detection of data corruption or for computing a signature in order to store payload data in the memory unit 14. It may be arranged to receive a call operation $\Gamma$ as input and to select a first applicable configuration. A configuration $\xi_i$ is applicable if it is active, i.e., if it was fetched by the fetch-and-update unit 16, and the currently executed operation matches one of the predicates $\lambda_j$ defined for that configuration:

$\xi_i$ is applicable for $\Gamma \Leftrightarrow \exists \lambda r_{j,r_k} \in \{\lambda(\xi_{type})\}$ where $\Gamma_j = \Gamma$ and $\Gamma$ is a load or store operation on register $r_k$ $$\xi_{app}: \left(\bigcup_{i=1}^{n} C\right) \times O$$

$\xi_{app}(\xi i, \ldots, \xi n, \Gamma) :=$ $$\begin{cases} \xi i, & \text{where } \xi i \text{ is the first applicable context configuration} \\ undef, & \text{if no such configuration exists} \end{cases}$$

If no configuration is applicable, e.g., $\Gamma$ is neither load nor store which uses an address register which is subject to data corruption detection, the signal $\xi_{app}$ may be undefined. Another signal, namely, $\gamma\xi_{app}$, may be provided by the arbitration unit 18 in order to indicate whether data corruption detection is active.

$$\gamma\xi_{app}: \left(\bigcup_{i=1}^{n} C\right) \times O \rightarrow \{active, inactive\}$$

$\gamma\xi_{app}(\xi i, \ldots, \xi n, \Gamma) := \begin{cases} 'active', & \text{if } \xi_{app}(\xi i, \ldots, \xi n, \Gamma) \text{ is defined} \\ 'inactive', & \text{else} \end{cases}$ A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

For example, the units 26 to 30 may be integrated in the core unit 12 or in the memory unit 14.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

What is claimed is:

1. A device for executing a program in a sequence of instruction cycles, the program comprising instructions stored in a plurality of memory locations of a memory unit, wherein the device comprises:

a program counter arranged to provide a program counter value;

a memory access unit arranged to read a data word from a memory location identified by the program counter value, wherein the data word comprises an instruction and a protection signature;

a signature unit arranged to determine a signature function corresponding to the program counter value and to determine a verification signature by applying the signature function to the instruction;

a processing unit arranged to execute the instruction if the verification signature and the protection signature are consistent with each other;

an error signal unit arranged to initiate an error action if they are inconsistent with each other; and a context value unit arranged to provide a context value to the signature unit and to update the context value for each instruction cycle, the context value being used to define a specific signature function for each of the plurality of memory locations storing the instructions of the program;

wherein the signature unit is arranged to determine the signature function on the basis of the context value, and wherein the context value unit is arranged to determine the context value as $J=x_{id}\|(x_{mod}*x_{pol} \mod 2**p)$ wherein the symbol .parallel. means "concatenated with", the symbol * means "multiplied by", the symbol ** means "to the power of", $x_{id}$ is a context identifier, $x_{pol}$ is a generator polynomial of size p, and $x_{mod}$ is a dynamic context-modifier.

2. The device of claim 1, wherein the signature function depends parametrically on the context value.

3. The device of claim 1, wherein the context value unit is arranged to update the context value for each instruction cycle by: incrementing the context value by one increment in response to the instruction of a preceding instruction cycle being a normal instruction; and incrementing the context value by a multiple of said increment in response to the instruction of a preceding instruction cycle being a relative jump instruction.

4. The device of claim 1, arranged to determine the signature function on the basis of the program counter value.

5. A method comprising:

providing a program counter value; and performing a sequence of instruction cycles, wherein each instruction cycle comprises:

updating the program counter value;

reading a data word (w) from a memory location identified by the updated program counter value, wherein the data word comprises an instruction and a protection signature;

determining a verification signature (c) by applying a signature function associated with the program counter value to the instruction;

executing the instruction if the verification signature and the protection signature are consistent with each other;

initiating an error action if they are inconsistent with each other; and providing a context value to define a specific signature function for each of a plurality of memory locations that store the instructions of the program, wherein the context value is determined as $J=x_{id}\|(x_{mod}*x_{pol} \mod 2**p)$ wherein the symbol .parallel. means "concatenated with", the symbol * means "multiplied by", the symbol ** means "to the power of", $x_{id}$ is a context identifier, $x_{pol}$ is a generator polynomial of size p, and $x_{mod}$ is a dynamic context-modifier.

6. The device of claim 5, wherein the signature function is a checksum function.

7. The device of claim 5, wherein determining the signature function comprises: determining a generator polynomial.

8. The method of claim 5, comprising: providing the context value separately from the program counter value; wherein the operation of determining the signature function comprises:

updating the context value, and determining the signature function in dependence on the context value.

9. The method of claim 5, wherein the signature function depends parametrically on the context value.

10. The method of claim 8, wherein updating the context value comprises:

incrementing the context value by one increment in response to the instruction of a preceding instruction cycle being a normal instruction; and incrementing the context value by a multiple of said increment in response to the instruction of a preceding instruction cycle being a relative jump instruction.

\* \* \* \* \*